June 22, 1948. J. W. HUBBARD 2,443,620
PROCESS FOR HEAT-TREATING MATERIALS
Filed June 24, 1944 2 Sheets-Sheet 2
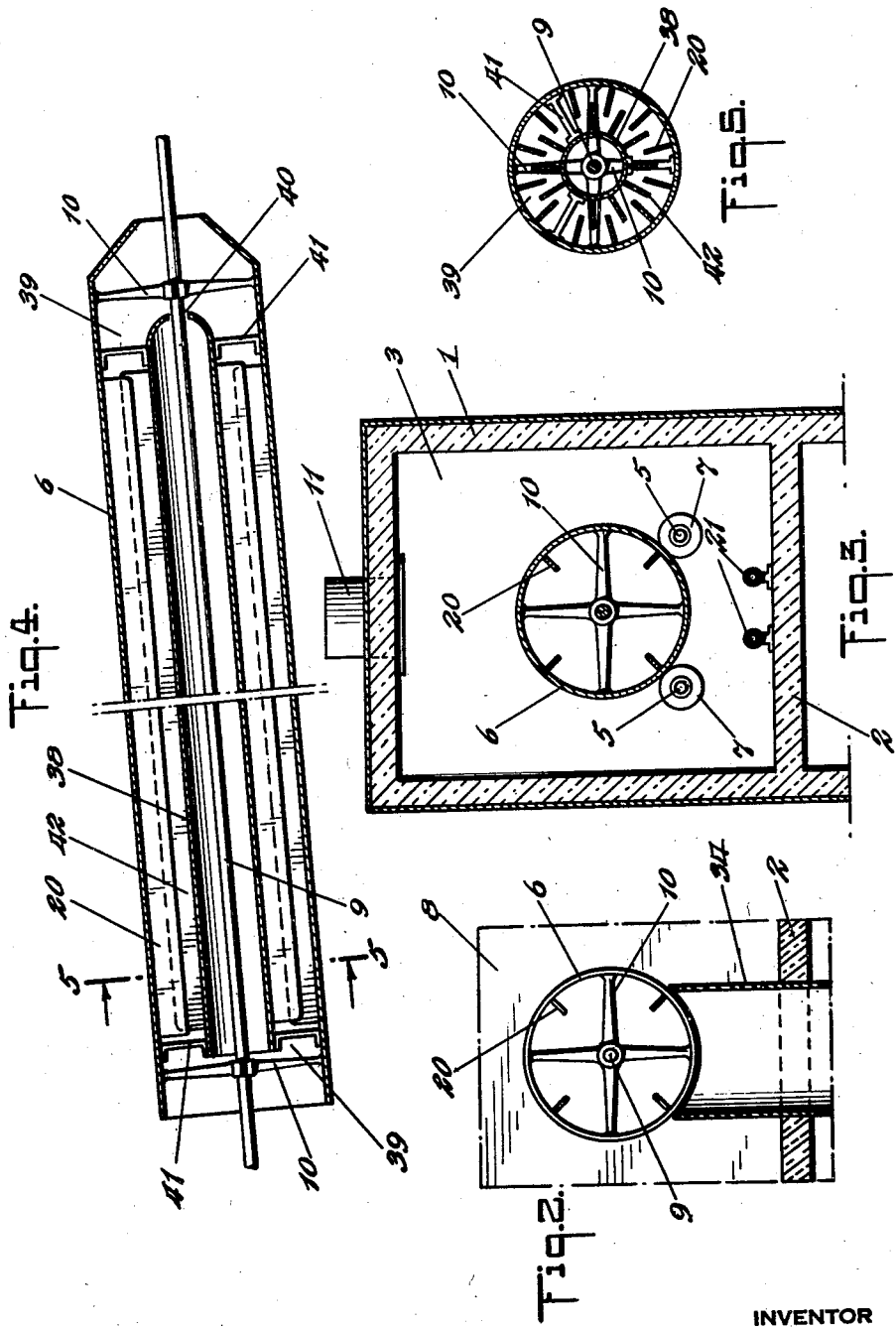
INVENTOR
JOHN WILLIAM HUBBARD
BY
ATTORNEY Patented June 22, 1948

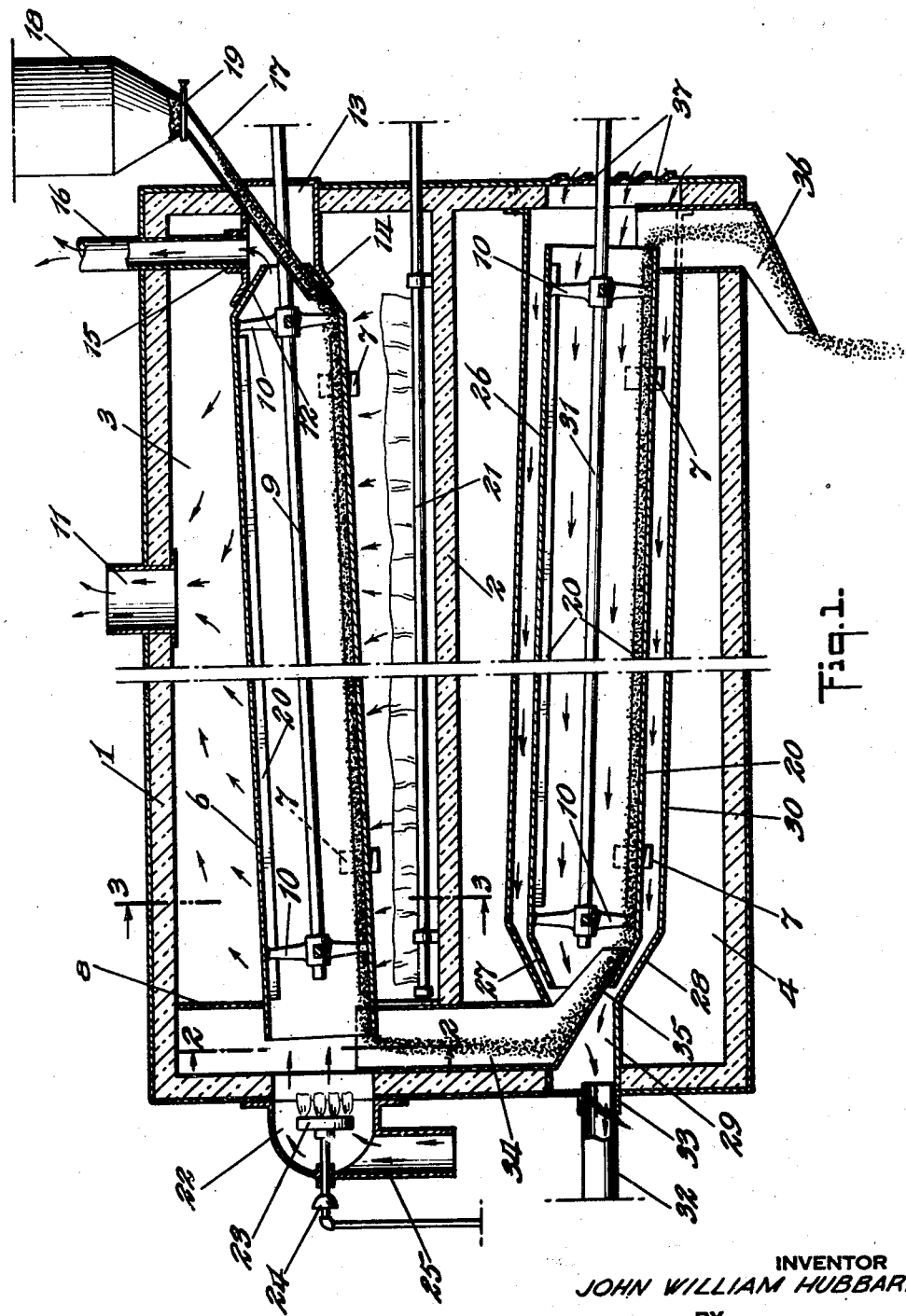

2,443,620

UNITED STATES PATENT OFFICE 2,443,620

PROCESS FOR HEAT-TREATING MATERIALS

John William Hubbard, New York, N. Y., assignor to Alaska Pacific Salmon Company, Seattle, Wash., a corporation of Nevada Application June 24, 1944, Serial No. 541,994

15 Claims. (Cl. 99—68)

The present invention relates to a process for roasting coffee and, more particularly, to a novel process for roasting coffee beans continuously and in a relatively short time.

Heretofore it has been the almost universal practice to roast green coffee for a twenty to thirty minute period and in batch operation. Many attempts have been made to provide continuous roasting processes or even to shorten the time period, but a generally unsatisfactory product lacking in homogeneity and in uniformity of color has been obtained.

It is an object of the present invention to provide a novel process for roasting a continuous stream of coffee beans in a relatively short time, say up to about three minutes, whereby a coffee product which is homogeneous and uniform in color is obtained.

It is also an object of this invention to provide a new method for roasting coffee during a short roasting period which insures the retention of volatile oils and flavoring principles normally lost by vaporization in the long roasting of prior art methods.

Another object of the invention is the provision of a new roasting process to produce a coffee composition giving aqueous infusions of unusually fine flavor and aroma.

Further objects and advantages will be apparent from the following description taken in conjunction with the accompanying drawings, wherein Fig. 1 depicts a longitudinal sectional view of a coffee roasting device for carrying out the process of this invention;

Figs. 2 and 3 are cross sectional views of the device taken, respectively, at line 2—2 and at line 3—3 of Fig. 1, looking in the direction of the arrows, and Figs. 4 and 5 illustrate fragmentary longitudinal sectional and cross sectional views, respectively, of a modification of this device.

According to this invention, a stream of coffee beans is contacted with a hot heat-conducting surface for a relatively short time. The beans are preferably agitated during such contact, and a hot gas stream, in concurrent, countercurrent or transverse flow with respect to the coffee, is passed over and through the coffee to remove moisture and other volatiles liberated therefrom. This sweeping action by the gas stream tends to prevent localized cooling above the heat-conducting surface due to vaporization of moisture in the coffee. Countercurrent passage of the hot gas stream through the coffee is preferred, and it is desirable to provide radiant heat for treating the coffee beans near the finish of the roasting period. If desired, the source of radiant heat may also be employed for supplying heat to the stream of hot gas passed through the coffee. After the roasting operation, the coffee can be cleaned of chaff and can be quickly cooled to avoid subsequent change of color.

In general, the interior of a metal cylinder is employed as the heat-conducting surface, the cylinder preferably being heated externally by hot gases, although other heating means may be used. The temperature of the gases and the time of treatment vary, of course, depending upon the size and grade of coffee bean roasted and upon its moisture content. It has been found for the most part that conditions which provide a maximum temperature for the bean of about 325° F. to about 550° F. give the most satisfactory result. Lower temperatures normally provide too light a roast, so that the flavor of the coffee is not fully developed, while higher temperatures result in undesirable charring. While the time required for roasting depends upon a number of factors, including temperature of the external hot gases and of the hot gas stream in contact with the coffee, amount of coffee roasted in unit time, ratio of hot gases to coffee, etc., a period of from seventy-five seconds to three minutes, preferably ninety seconds to two and a half minutes, is generally satisfactory.

The main source of heat employed for the roasting operation is that contained in the hot gases which heat the heat-conducting surface in contact with the coffee beans. The hot gas normally used is air which has been heated in a gas flame, and the heated air contains the products of combustion. Other hot gases may also be employed. It is preferred to tumble the coffee beans in a rotary metallic drum and to provide gas flames beneath the drum. Air in excess of that needed for combustion is furnished to the burners. The heated air and combustion products give up a large part of their heat to the outside of the drum, so that heat is transferred to the coffee beans by conduction. The hot gases may then either pass into the drum to give up more of their heat to the beans or go directly out through an exhaust. While certain economies are possible in the first-mentioned procedure through thus removing additional heat from these hot gases before exhausting them, the preferred practice is to remove them without contact with the coffee. According to this latter procedure, fresh hot gases are passed into and through the drum for contact with the beans without dilution by gases from which a large part of the heat has already been removed. Moreover, when employing radiant heat at the discharge end of the drum, as is preferred, these spent gases may not adequately support combustion. The gases are at their maximum temperature just below the drum, and this temperature may vary widely, being commonly of the order of 500° F. to 800° F. After passing around the drum and giving up heat thereto, the temperature of the gases is usually about 450° F. to about 650° F. For a capacity of 400 to 800 pounds of coffee per hour, it is preferred to use about 600 to 1000 cubic feet of hot air per minute.

The larger the amount of coffee in the drum at a single time, the larger is the amount of moisture which must be volatilized. However, there is a practical limitation upon the amount of heat which can be introduced through the metal shell for this purpose, as too high a temperature is apt to cause local overheating and charring. An auxiliary source of heat and means for carrying off moisture and other volatiles liberated in the very rapid roast of this process are provided. These comprise a stream of hot gases which passes through the drum in intimate and preferably countercurrent contact with the roasting coffee beans and which sweeps the moisture-laden atmosphere away. The hot gas normally used results from the products of combustion of a gaseous fuel mixed with only enough excess air to reduce the temperature to about 450° F. to about 800° F. The burner employed can also advantageously serve as a source of radiant heat which can be directed to the discharge end of the drum and which can be regulated both as to its intensity and as to its effective distance. Such a radiant heat source is a plate type or gun type burner located near the discharge end of the roasting drum and pointed into the drum. The gas flame at this burner surface can be regulated with respect both to its temperature and to its length. It is preferred, however, not to employ so long a flame as to extend into the drum, as the present process does not contemplate flame-roasting.

Increased efficiency in transferring the radiant heat to the coffee beans in the drum can be obtained by locating the burner in a refractory chamber and by providing a reflecting surface behind the flame. This surface is preferably approximately paraboloidal, and the burner is located somewhere near its focus, as it has been found that the radiant heat can be transferred into the drum most effectively under these conditions and is thereby reflected substantially evenly.

After the gases have passed through the drum countercurrent, their temperature is of the order of 400° F. to about 650° F. The gases are drawn to an exhaust blower at a sped sufficient not only to sweep away the moisture, but also to remove chaff and clean the roasted beans. The temperature at which the coffee beans leave the roasting drum is normally the maximum temperature which they attain during the roasting process. Unles rapidly cooled, subsequent to such discharge, the temperature remains high enough for a considerable period to continue the roasting. It is therefore preferred to employ a cooling drum in which the hot beans can be tumbled in contact with fresh air to lower their temperature in a very short time. This procedure normally reduces their temperature in 75 to 180 seconds, say 90 seconds to 150 seconds, to a temperature at which the coffee can be conveniently handled, packaged or stored. The amount of air employed for contacting the coffee is largely determinative of the rate of cooling, and it has been found that about 200 to 300 cubic feet of air per pound of coffee is a suitable volume. At times it is desired to permit a controlled degree of roasting after discharge from the roasting drum, and the volume rate of fresh air can be regulated to accomplish this purpose. Such regulation may be by adjustment of dampers or, more conveniently, by bypassing a portion of the air stream.

The roasted coffee may be produced in any desired color by adjusting the treating conditions and, for a given set of conditions as applied to a relatively homogeneous quantity of green coffee, a remarkable uniformity in color can be obtained. Moreover, the homogeneity of the coffee is not lost, as in the case of prior art roasting processes. The fast roast provided by the present invention retains volatile oils which enhance the aroma and flavor.

A preferred embodiment of the invention will now be described, but it will be appreciated that the present invention is not limited thereto.

Referring to Fig. 1, the apparatus has an insulated casing 1 with an insulated partition 2 disposed substantially horizontally therein to divide the casing into an upper or roasting chamber 3 and a lower or cooling chamber 4. A pair of rods 5 are rotatably journaled in the end walls of the casing, suitable bearings being provided. The rods support a rotary cylindrical drum 6 upon rollers 7 which are mounted on the rods and which make frictional contact with the drum. One end of each rod is slightly lower than the other end, thus causing the drum 6 to lie in a slightly inclined position. The lower end of the drum is positioned in a baffle partition 8 which extends the entire width of chamber 3 for its full height and is spaced from the adjacent end wall. A shaft 9 is axially located in the drum and is connected therewith by means of spiders 10 fixedly attached to both the shaft and the inner surface of the drum. The shaft extends through one end of the drum and through the adjacent end wall of the casing, and means are provided outside the casing for rotating the shaft. A flue duct 11 communicating with a damper to an exhaust blower is provided at the top of chamber 3.

The higher end of drum 6 is beveled to provide a constricted inlet 12, and through this opening the interior of the drum communicates with the interior of an exhaust box 13. This box is cylindrical in shape and has a flaring mouth 14, the inner surface of which is adapted to make a tight frictional joint with the outer beveled surface of the inlet 12 of the drum. An orifice 15 in the box 13 communicates with a damper to the exhaust blower through a duct 16 positioned in said orifice, and the feed pipe 17 from a hopper 18 outside the casing passes through the box and into the inlet 12 of the drum. A gate 19 is adapted to control the volume of material which can pass from the hopper to the drum in unit time. The drum contains a plurality of vanes or flights 20 affixed thereto and adapted for agitation of material therein.

A pair of strip burners 21 are located beneath the drum 6 and extend longitudinally in the roasting chamber 3. Each burner is adapted to provide a sheet of flame beneath the drum for substantially its entire length. The burners pass through an end wall of the casing and communicate with a source of gaseous fuel, and the sides of the casing are equipped with louvers opening into the chamber 3 to furnish air for the strip burners. The lower end of the drum 6 is spaced from the end of the chamber 3 adjacent thereto, and at this end of the chamber 3 there is a refractory combustion chamber 22 in substantial axial alignment with the drum 6 and open thereto. The radiation space is roughly paraboloidal in shape and its concave inner surface facing the drum is adapted to reflect radiant heat into the lower end of the drum. A circular plate burner 23 having its center at approximately the mathematical focus of the combustion chamber is adapted to provide a cylinder of flame extending toward but not into the end of the drum. A gas pipe 24 extending through the end of the radiation space 22 connects the plate burner with a source of gaseous fuel. An air duct 25 communicates with chamber 22 behind the burner 23.

A rotary cylindrical drum 26 is mounted in the cooling chamber 4 in a manner similar to the mounting of drum 6 in the upper chamber, but drum 26 is inclined in the opposite direction. Like drum 6, the upper end of drum 26 is also constricted to form an inlet 27. The beveled outer surface of the constricted inlet is adapted to make a tight frictional joint with the inner surface of the flaring mouth 28 of an exhaust box 29, and the rotary drum 26 is positioned within a substantially coaxially located stationary cylinder 30 which is constructed integral with the flaring mouth 28. Means (not shown) are provided for advancing or withdrawing the drum 26 into frictional contact with the mouth 28 of the box 29. The rotary drum 26 is also adapted to be rotated by a shaft 31, and it is equipped with vanes 20 for agitation of its contents during rotation. The exhaust blower is connected to the box 29 through a duct 32 which fits in an orifice 33 in the box.

A conduit 34 is provided for communicably connecting the upper and lower chambers. The upper end of the conduit is disposed at the lower end of drum 6 (see also Fig. 2) and is adapted to receive material spilling therefrom. The conduit fits closely in a port in the partition 2, and its lower end communicates with the upper end of drum 26 through a feed duct 35 which extends into the constricted inlet 27. At the lower end of drum 26 there is a discharge hopper 36 adapted to receive material passing from the drum, and the lower end of said hopper extends through a port in the bottom of the casing.

The lower end of the drum 26 is spaced from the end wall of the chamber 4 at the end of the chamber adjacent to said lower end, and a portion of this end wall is equipped with louvers 37 for admittance of air. The stationary drum 30 which surrounds drum 26 is supported at its lower end by this end wall, and the louvers 37 are located within the area of the end wall corresponding to the position occupied by the lower end of drum 30.

The operation of the apparatus described is relatively simple and does not require the service of highly skilled personnel. Its operation will now be described with respect to an illustrative example, but it will be appreciated by those skilled in the art that neither this apparatus nor the inventive process are limited to such operation.

Employing roasting and cooling chambers about 8 feet 6 inches in length with rotary cylindrical drums of 7 feet 6 inches in length and 27 inches in diameter mounted therein, said drums having a pitch of approximately ¼ inch per foot, a quantity of green coffee beans containing about 18% moisture is put in the hopper 18, and gate 19 is adjusted to feed the beans to the drum 6 at a rate of 650 pounds per hour. The shaft 9 is rotated at a speed of 35 revolutions per minute (R. P. M.), and the shaft 31 of the drum in the cooling chamber is rotated at approximately the same speed. The exhaust blower, communicating respectively with ducts 11, 16 and 32, is set to carry 3500 cubic feet of gas (air and combustion products) per minute (C. F. M.), and the dampers are regulated to draw about 750 C. F. M. through duct 10, about 250 C. F. M. through duct 16 and some 2500 C. F. M. through duct 32.

The blower, being connected through duct 16 to the roasting chamber 3, draws air through the louvers at the sides of the chamber and across the burners 21. This furnishes air for combustion of the gaseous fuel, and the excess air is heated. The hot gas envelopes the outside of drum 6, transferring a large portion of its heat thereto, and flows out through flue duct 11.

The amount of air drawn by the blower through the air duct 25 to the plate burner 23 is carefully controlled, and the length of the flame is regulated to provide radiant heat within the drum 6, particularly near its lower end. The hot gas, including combustion products from the plate burner, passes up the inside of the drum in countercurrent flow with respect to the coffee beans which are being tumbled and vigorously agitated in the drum. The gases pass into the exhaust box 13 and from there to the exhaust blower. The amount of gaseous fuel furnished is controlled to provide an exhaust gas temperature of about 550° F., and the proportions of fuel between the strip burners and the plate burner are adjusted so that the roasted coffee beans, which are in the drum about 130 seconds, are at a temperature of some 400° F. when spilled into the conduit 34. The flow of gas through the drum removes chaff to the blower and cleans the coffee.

The hot roasted beans are carried from the conduit by the feed duct 35 into the rotating drum 26 where they are again vigorously agitated. The exhaust blower connected to duct 32 draws air through the louvers 37 into the cooling chamber. The means for controlling the position of the rotary drum 26 in this chamber is adjusted to space the outer surface of inlet 27 from the mouth 28 of the exhaust box 29 at a distance such that fresh air passes around the rotary drum 26 and inside the stationary drum 30 and thus into the exhaust box at a rate of about 500 C. F. M. The remainder of the air (approximately 2000 C. F. M.) passes through drum 26 in countercurrent flow to the coffee and into the exhaust box. The coffee passes through the drum in about 130 seconds and spills into the discharge hopper 36 at about 120° F.

The coffee thus produced has a rich brown color, and an aqueous infusion produced therefrom is of unusually fine flavor and aroma.

It is often desirable to provide a substantially coaxial inner drum 38 (Figs. 4 and 5) within drum 6. This in effect makes the central portion of drum 6 a relatively passive zone, so that the hot gas stream is substantially confined to the annular space 39 between the drums. It is preferred that drum 38 be open at its lower end and closed at its upper end, and an orifice 40 is preferably provided in the closed end so that a small proportion of the hot gas stream can pass through the inner drum and eliminate cool spots. The drum 38 is positioned inside drum 6 by means of struts 41 which tie it to drum 6 and cause it to rotate therewith. Vanes or flights 42 on the periphery of the inner drum and disposed substantially longitudinally therealong are preferably spaced between vanes 20 on the inside surface of drum 6 and cooperate with them for more efficient agitation of the coffee beans in the annular space 39. The vanes 20 and/or the vanes 42 may be given a slight helical turn either forward or backward with respect to the direction of rotation of the drums and can thus either decrease or increase the time required for the coffee beans to pass through drum 6.

Although the present invention has been described with respect to particular embodiments and examples, it will be appreciated by those skilled in the art that variations and modifications may be made therein and that various equivalents may be substituted therefor without departing from the spirit of the invention. Moreover, while the invention has been described with reference to the roasting of green coffee beans, the process is also applicable to the roasting or heat-treating of other alimentary products, including cocoa beans, peanuts, certain grains and legumes, etc. These and other variations and modifications are believed to be within the scope of the present specification and within the purview of the appended claims.

I claim:

1. A process for roasting coffee which comprises contacting substantially raw coffee beans during a time period of about 75 seconds to about three minutes with a heat-conducting surface subjected to a temperature of about 500° F. to about 800° F., and passing a hot gas stream in contact with said coffee beans during contact with the heat-conducting surface, said gas stream being at a temperature and volume sufficient to remove moisture and other volatiles liberated from said beans.

2. A process for roasting coffee which comprises contacting substantially raw coffee beans with a heat-conducting surface subjected to a temperature of about 500° F. to about 800° F., maintaining said contact for a time period sufficient to roast the coffee beans without undesirable charring, and passing a hot gas stream in contact with said coffee beans during contact with the heat-conducting surface, said gas stream being at a temperature and volume sufficient to remove moisture and other volatiles liberated from said beans.

3. A process for roasting coffee which comprises heating raw coffee beans to a maximum temperature of about 325° F. to about 550° F. during a time period of about 75 seconds to about three minutes, and passing a stream of hot air in intimate contact with the coffee beans during said time period.

4. A continuous process for roasting coffee which comprises continuously advancing a stream of raw coffee beans through a treating zone in contact with a hot heat-conducting surface, the coffee beans being in said zone about 90 seconds to about 2½ minutes; continuously passing a hot gas stream through said treating zone countercurrent to the direction of flow of the coffee beans and in intimate contact with said beans; and maintaining the temperatures of the hot surface and the hot gas stream sufficient to heat the coffee beans to a temperature of about 325° F. to about 550° F. during said time period.

5. A continuous process for roasting coffee which comprises heating a continuous stream of raw coffee beans to a maximum temperature of about 325° F. to about 550° F. during a time period of about 75 seconds to about three minutes whereby the coffee beans are roasted without undesirable charring and whereby moisture and other volatiles are liberated from the beans, and continuously passing a hot air stream in intimate and countercurrent contact with the beans to remove said moisture and other volatiles.

6. The process set forth in claim 5 wherein the hot air stream is passed in contact with the coffee beans in sufficient volume and at sufficient velocity to remove chaff therefrom.

7. The process set forth in claim 5 wherein the hot air stream is passed in contact with the coffee beans at a volume rate equivalent to about 45 to about 150 cubic feet of hot air per pound of coffee beans, whereby chaff is removed from said beans.

8. The process set forth in claim 5 wherein the hot air stream is at a temperature of about 450° F. to about 800° F. upon initial contact with the coffee beans.

9. A continuous process for roasting coffee which comprises continuously advancing a stream of raw coffee beans through a treating zone in contact with a hot heat-conducting surface, said beans being in said zone for about 75 seconds to about three minutes; agitating said coffee beans therein; continuously passing a hot air stream through said treating zone countercurrent to the direction of flow of the coffee beans and in intimate contact with said beans; subjecting the coffee beans to radiant heat in said treating zone adjacent the discharge end thereof; and regulating the total heat supplied to the coffee beans in said treating zone to provide a temperature of the beans on discharge therefrom of about 325° F. to about 550° F.

10. The process set forth in claim 9 wherein the coffee beans are in the treating zone for about 130 seconds and are discharged therefrom at approximately 400° F.

11. A process for roasting coffee which comprises heating raw coffee beans to a temperature of about 325° F. to about 550° F. during a time period of about 75 seconds to about three minutes, passing a stream of hot air in intimate contact with the coffee beans during said time period, and thereafter substantially immediately contacting the roasted coffee beans with a stream of air at approximately room temperature.

12. A continuous process for roasting coffee which comprises heating a continuous stream of raw coffee beans to about 325° F. to about 550° F. during a time period of about 75 seconds to about three minutes whereby the coffee beans are roasted without undesirable charring and whereby moisture and other volatiles are liberated from the beans, continuously passing a hot air stream in intimate and countercurrent contact with the beans to remove said moisture and other volatiles, and thereafter substantially immediately continuously passing the roasted coffee beans in contact with a countercurrent stream of air at approximately room temperature and in sufficient volume to cool the beans in about 75 seconds to about three minutes to a temperature suitable for packaging and storing.

13. A continuous process for roasting coffee which comprises continuously advancing a stream of raw coffee beans through a treating zone in contact with a hot heat-conducting surface, said beans being in said zone for about 75 seconds to about three minutes; agitating said coffee beans therein; continuously passing a hot air stream through said treating zone countercurrent to the direction of flow of the coffee beans and in intimate contact with said beans; subjecting the coffee beans to radiant heat in said treating zone adjacent the discharge end thereof; regulating the total heat supplied to the coffee beans in said treating zone to provide a temperature of the beans on discharge therefrom of about 325° F. to about 550° F.; and thereafter substantially immediately continuously passing the roasted coffee beans in contact with a countercurrent stream of air at approximately room temperature and in sufficient volume to cool the beans to approximately 120° F. in about 130 seconds.

14. A process for roasting coffee which comprises heating substantially raw coffee beans to a maximum temperature of about 325° F. to about 550° F. for a time period sufficient to roast the coffee beans without undesirable charring, and passing a hot gas stream in intimate contact with the coffee beans during said time period, said gas stream being at a temperature and volume sufficient to remove moisture and other volatiles liberated from said beans.

15. A process for roasting coffee which comprises heating substantially raw coffee beans to a maximum temperature of about 325° F. to about 550° F. during a time period sufficient to roast the coffee beans without undesirable charring, passing a hot gas stream in intimate contact with the coffee beans during said time period, said gas stream being at a temperature and volume sufficient to remove moisture and other volatiles liberated from said beans, and thereafter substantially immediately rapidly reducing the temperature of the roasted coffee beans.

JOHN WILLIAM HUBBARD.

REFERENCES CITED

The following references are of record in the file of this patent:

UNITED STATES PATENTS

| Number | Name | Date |
| --- | --- | --- |
| 1,313,020 | Schnuck | Aug. 12, 1919 |
| 1,515,385 | Grohens | Nov. 11, 1924 |
| 1,603,189 | Bruning | Oct. 12, 1926 |
| Re.19,390 | Meade | Dec. 4, 1934 |
| 2,097,591 | Finley | Nov. 2, 1937 |
| 2,348,066 | Goldfine | May 2, 1944 |
| 2,388,298 | Stephens | Nov. 6, 1945 |